S. Gregg.
Spectacles.
Nº 59,995. Patented Nov. 27, 1866.
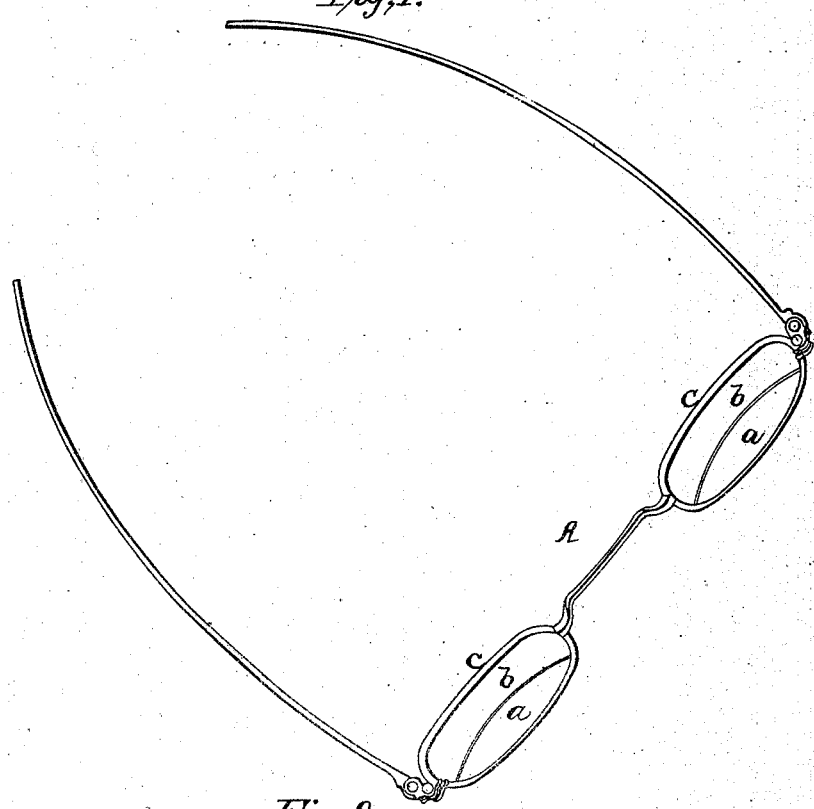
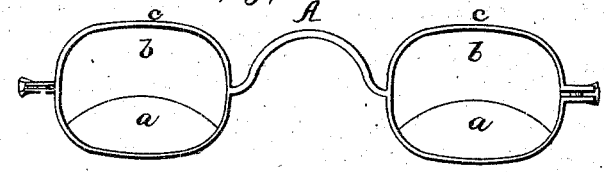
 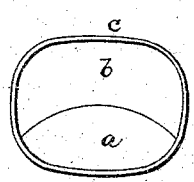 
Witnesses:
E. R. Drake
J. L. Newton
Inventor.
Samuel Gregg

United States Patent Office.

IMPROVEMENT IN SPECTACLES.

SAMUEL GREGG, OF BOSTON, MASSACHUSETTS.

Letters Patent No. 59,995, dated November 27, 1866.

SPECIFICATION.

TO ALL WHOM IT MAY CONCERN:

Be it known that I, SAMUEL GREGG, of Boston, in the county of Suffolk, and State of Massachusetts, have invented a new Improvement in Spectacles; and I hereby declare that the following is a full and exact description thereof, reference being had to the accompanying drawings, and to the letters of reference marked thereon, making a part of this specification, of which—

Figure 1 is a perspective view of the invention.
Figure 2 is a front view of ditto.
Figure 3 is a section of one eye of ditto.
Figure 4 is a front view of the concave lens.
Figure 5 is a section of the same.

The letter A represents the spectacles, $b\ b$ the glasses of ditto, $a\ a$ the lower convex part of the same, and $c$ the frame of ditto.

In order that others skilled in the art may be able to manufacture and use my invention, I will proceed to explain the same.

It will be perceived, by examining the accompanying drawings, fig. 3, that the lens of the spectacles is of peculiar shape. It is well known that the convexity of the eye becomes less as persons grow older, and hence old persons are accustomed to use convex lens to see more clearly objects which are near, while objects at a distance can be seen without the use of convex lens or spectacles. So it is of no little trouble to be obliged to use spectacles to see objects that are near, while the spectacle must be removed to see objects that are more distant. To obviate this difficulty I have invented my improvement in spectacles. By examining fig. 3 it will be perceived that on one side of the lens, towards the lower edge, the semicircular portion extending towards the middle of the lens is convex, which is convex for the purpose of magnifying objects immediately presented for close vision, as reading, sewing, &c. The rest of that side of the lens is plane or flat. The other side of the lens may be plane or convex to any degree necessary for the purpose of seeing objects at a distance; thus, by the plano-convex or the double-convex lens, distant or near objects are seen with equal facility through the same lens. The great advantage of my improvement is that distant objects are seen through the larger or upper portion of the lens, while vision is not obstructed by the convexity of the lower part of the lens, which is necessary for the distinct vision of near objects. So that by the use of my improved spectacles one can see distant objects through the upper portion of the lens, while he can see to read, or can see objects near to the eye, distinctly, without moving or removing the spectacles. The lower convex part of the lens being circular in its line with the upper part of the lens, enables one to see objects near to sidewise more readily without turning the head, while it leaves ample field for distant objects in the upper portion of the lens. The drawings, figs. 4 and 5, represent the same principle, except that the lens is a plano-concave adapted to short-sighted vision, allowing distant objects to be seen through the concave portion at the upper edge, and near objects through the plane glass, the advantage of which arrangement is readily understood. I am aware that spectacles have been made, each lens of which is composed of two pieces coming together in the centre; the upper one being plane or slightly convex, and the lower piece convex to a greater or less degree. I do not claim spectacles made in this way. I am aware, also, that glasses for spectacles have been constructed upon the broad claim, namely, with the upper portion of each glass being adapted to seeing distant objects, and the lower portion to objects near the eye, the portions being in one piece of glass. But the range of vision for the upper portion is limited to vision directly in front in the above claim, and this arrangement of the lens I disclaim. But I make an improvement upon the broad claim, namely, constructing two distinct and perfect segments of lens concentric in one piece of glass, the upper portion having a broad field of vision for the purpose of seeing distant objects, and the lower portion, a lens, with upper edge concentric with the edge of the upper portion, and distinctly defined, adapted to seeing objects near the eye, and having a narrow field of vision. The two lens do not interfere with each other; the upper being broad, has the full range for the eye, sideways as well as directly in front, and the lower needing but a narrow range for seeing objects near.

What I claim as my invention, and desire to secure by Letters Patent, is—

Constructing glasses of spectacles where two distinct lenses or segments of lenses are contained in one glass, adapted for seeing near and distant objects, in such a manner that the upper edge of the convex lens adapted for seeing near objects shall be concentric with the upper edge of the lens adapted for seeing distant objects for the purpose of enlarging the field of vision for the latter lens.

SAMUEL GREGG.

Witnesses:
E. R. DRAKE,
J. L. NEWTON.